Patented Oct. 20, 1925.

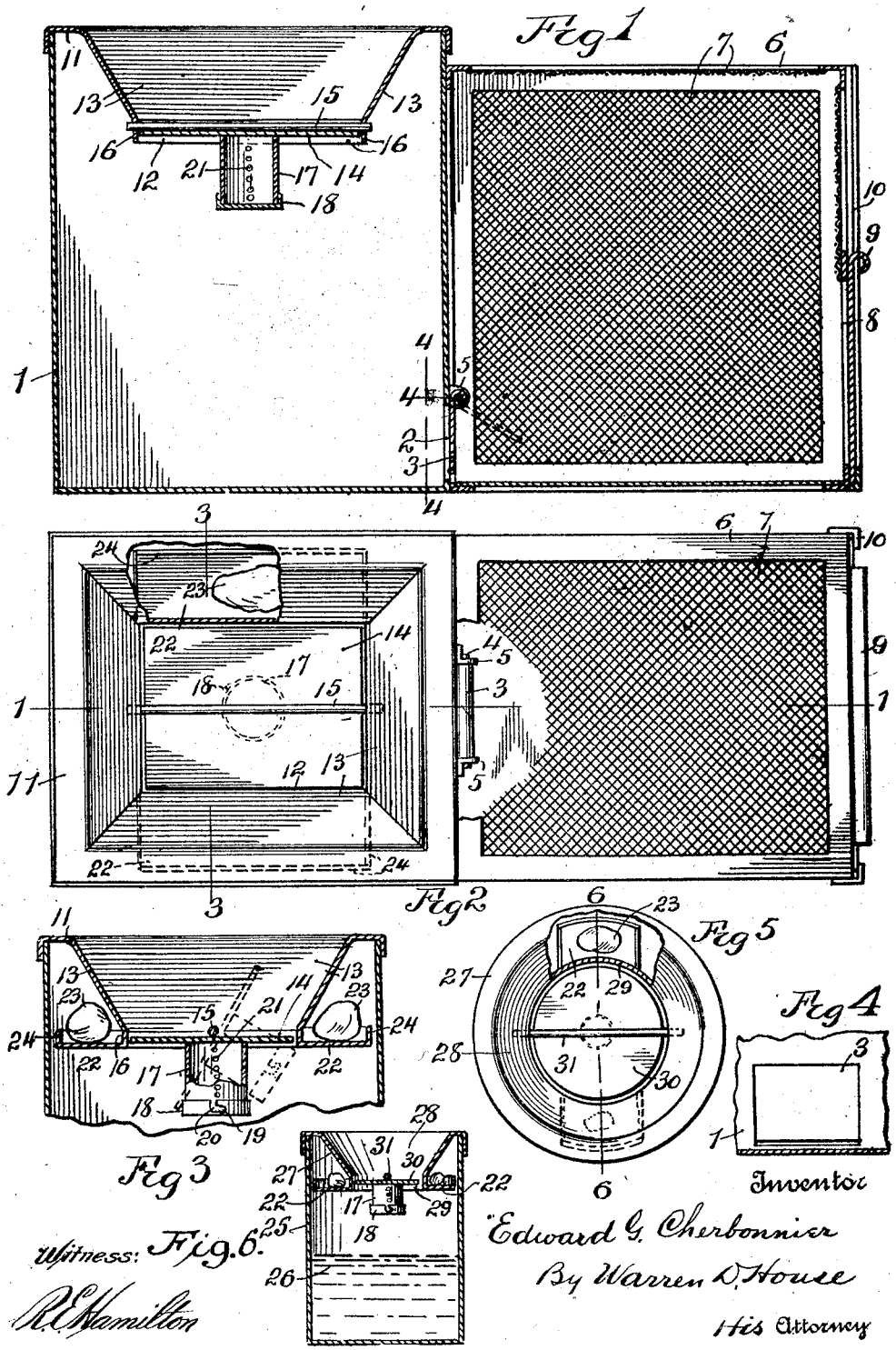

1,557,558

UNITED STATES PATENT OFFICE.

EDWARD G. CHERBONNIER, OF BALTIMORE, MARYLAND.

ANIMAL TRAP.

Application filed February 3, 1922. Serial No. 533,806.

*To all whom it may concern:*

Be it known that I, EDWARD G. CHERBONNIER, a citizen of the United States, residing at Baltimore, in the county of Baltimore and State of Maryland, have invented a certain new and useful Improvement in Animal Traps, of which the following is a specification.

My invention relates to improvements in animal traps.

One of the objects of my invention is to provide an animal trap which is simple, cheap to make, durable, not liable to get out of order, which is efficient in operation, which is humane, which is adapted to catch and hold many animals at the same time, and which permits of the ready removal of the animals caught.

A further object of my invention is to provide a novel trap cover, which is simple and cheap to make, and which may be readily applied to ordinary receptacles, such as cans or boxes, so as to form therewith a trap.

Still another object of my invention is to provide a novel trap door carrying a novel bait support so arranged as to normally force the trap door to the closed position.

The novel features of my invention are hereinafter fully described and claimed.

In the accompanying drawing which illustates my invention,

Fig. 1 is a central vertical section, on the line 1—1 of Fig. 2, of my improved animal trap.

Fig. 2 is a top view, partly broken away, of the same.

Fig. 3 is a cross section on the line 3—3 of Fig. 2, the lower portion of the animal receptacle being broken away, and the bait support being shown partly in vertical section and partly in side elevation.

Fig. 4 is a vertical section on the line 4—4 of Fig. 1.

Fig. 5 is a reduced top view, partly broken away, of a cylindrical form of my improved trap.

Fig. 6 is a vertical section on the line 6—6 of Fig. 5.

Similar reference characters designate similar parts in the different views.

Referring particularly to Figs. 1 to 4, 1 designates an animal receptacle, which may comprise an ordinary rectangular box having an open top, and which may be provided in one side near its bottom with a doorway 2, normally closed by a swinging door 3, pivotally suspended by a horizontal pivot pin 4, mounted in the upper end of the door 2, and having its ends respectively pivoted in two lugs 5, secured to the adjacent side of the box 1.

The door 3 is arranged to swing outwardly from a closed vertical position shown in solid lines in Fig. 1, into a rectangular cage 6, communicating interiorly with the box 1, through the doorway 2, and which has its adjacent side attached to the adjacent side of the box 1.

The cage 6 may have side and top openings covered by a screen wire 7.

Animals caught in the box 1 will seek egress therefrom through the doorway 2, by swinging the door 3 outwardly, and the latter will fall by gravity to the closed vertical position, after the animal has passed into the cage 6. The latter may be provided in one side with an exit opening 8, arranged to be closed by a vertical door 9, vertically slidable in suitable guides 10, provided respectively on the two adjacent corners of the cage 6.

For attracting the animals to be caught and for permitting them to enter the box 1, I provide a cover 11, adapted to be fitted over the open top of the box 1, and which is provided with a central opening 12, and with steeply inclined portions 13, which extend from the top of the cover 11, inwardly and downwardly to the opening 12.

A trap door normally closes the opening 12, and comprises a horizontal rectangular plate 14, mounted in the opening 12 and of slightly smaller dimensions than the latter and having secured centrally to its upper side a horizontal wire 15, which extends across the opening 12, and which has its ends respectively pivoted in two diametrically opposite flanges 16, of which there are four which extend respectively downwardly from the lower ends of the inclined portion 13.

For normally forcing the trap door 14 to the horizontal closed position, shown in Figs. 1 and 2 and in solid lines in Fig. 3, suitable means may be employed. For this purpose, I have shown in the drawing, a vertical tube 17, having its upper end centrally secured to and closed by the under side of the plate 14. The lower end of the tube 17 is adapted to have fitted to it a removable cap or cover 18, which with the tube 17 and plate 14 forms a bait support or receptacle, and which serves the function of normally forcing the trap door to the closed position, after the latter has been tilted by an animal entering the box 1, through the opening 12.

For releasably holding the removable cover 18, attached to the tube 17, the latter has mounted in it adjacent to its lower end a laterally extending pin 19, Fig. 3, which is adapted to enter a slot 20, of right-angled form, provided in the upper edge of the peripheral flange with which the cover 18 is provided.

Upon properly positioning the cover 18 on the tube 17 the pin 19 may be made to enter the slot 20. Upon then turning the cover counter-clockwise, the pin 19 will enter the lateral portion of the slot 20, thereby securely holding the cover on the tube. The latter may be provided with openings 21, to permit the emission of odor from the bait which may be placed in the bait holder, so that the animals to be caught will smell the bait.

The trap may be so disposed that the animals to be caught can get on the cover 11. Such animals will smell the bait in the bait holder and in trying to get at it will slide down the steeply inclined portions 13, onto the trap door 14, upon which the weight of the animal will tilt the trap door, as shown in dotted lines in Fig. 3, and the animal will be deposited in the box 1.

The weight of the bait and bait holder will at once cause the trap door to swing to the closed position, thus preventing egress of the animals in the box through the opening 12 in the cover 11.

As shown in Figs. 1 and 4, a space may be provided between the lower edge of the door 3 and the bottom of the cage 6, for the admission into the box 1 of light from the cage 6. The animals in the box 1 observing the light entering through this space, will pass into the cage 6, through the doorway 2. The animals which enter the cage 6 may be discharged through the opening 8 and disposed of as desired.

For increasing the odor which attracts the animals and causes them to enter the box 1 in the manner described, additional bait holders may be provided, as shown in Figs. 2 and 3. Such additional bait holders may consist of horizontal platforms 22, which extend outwardly from opposite flanges 16, and which are adapted to support suitable bait 23. The ends and outer edge of each platform 22 may be provided with upwardly extending flanges 24, which serve to hold the bait from rolling off the platform preparatory to placing the cover 11 on the box 1.

As shown in the drawing, the upper ends of the inclined portions 13 are preferably disposed at a substantial distance inwardly from the outer edges of the cover 11. This construction enables the cover 11 to be applied to boxes of different widths. The covers may be sold separately and applied by the purchaser to any suitable box which he may have in his possession upon which the cover may be fitted.

In Figs. 5 and 6, is illustrated a type of cover embodying my improvement which is adapted to be fitted on the upper end of a cylindrical can or box 25, which may be adapted to hold liquid 26, such as water, into which the animals entering the can or box will fall and drown.

In this form of my invention, the removable cover 27 for the open top of the can or box 25 is of circular form and is provided with a steeply inclined downwardly converging central conical portion 28, which corresponds in function to the inclined portions 13, of the form shown in Fig. 1, and which has its upper end spaced apart a substantial distance from the periphery of the cover. Depending from the lower end of the conical portion 28 is a central vertical tubular portion 29, in which is mounted a circular horizontal trap door, comprising a flat plate 30, spaced apart from the portion 29, and having its upper side centrally secured to a diametrical wire 31, the ends of which are mounted in the walls of the tubular portions 29. A bait receptacle comprising a vertical tube 17 has its upper end centrally secured to the lower side of the plate 30, and has fitted on its lower end, as already described, a removable cover 18.

Extending outwardly from opposite sides of the tubular portion 29, may be provided bait supporting platforms 22, which are similar in construction and function to those already described.

The mode of operation of the cover 27 and the trap door 30 are the same as has been described with reference to the corresponding parts of the form of my invention shown in Fig. 1.

An animal trying to obtain access to the bait in the trap, will slide down the conical portion 28, onto the pivoted door 30, upon which the latter will tilt and will discharge the animal into the liquid 26 in which the animal will be drowned.

The bait holder carried by the trap door 30, after the discharge of the animal will swing the trap door to the closed position. By having the bait holder arranged to carry bait at the under side of the door, it is impossible for the animal to get any of the bait and then get away, and the bait holder does not afford any means for the animal to get hold of to prevent its slipping inwardly from the tilted door.

I do not limit my invention to the structures shown and described, as many modifications, within the scope of the appended claims, may be made without departing from the spirit of my invention.

What I claim is:—

1. In an animal trap, a cover adapted to be fitted on the top of an animal receptacle, and having a central opening and steeply inclined portions extending from the top of the cover inwardly and downwardly to said opening, a trap door pivoted at its middle to said cover in said opening at the lower ends of said inclined portions and arranged to swing downwardly in either direction from a closed position, and means arranged to carry bait at the under side of the door for normally forcing said door to the closed position, substantially as set forth.

2. In an animal trap, a cover adapted to be fitted on the top of an animal receptacle and having an opening in the top thereof, a trap door pivotally supported by said cover in said opening, and a vertical tube having its upper end attached to and closed by said door and forming therewith a bait receptacle and having a removable cover attached to its lower end, the tube and removable cover being so disposed as to normally force the trap door to the closed position, substantially as set forth.

3. In an animal trap, a cover adapted to be fitted on the top of an animal receptacle, and having a central opening and steeply inclined portions extending from the top of the cover inwardly and downwardly to said opening, a trap door pivotally supported by said cover in said opening at the lower ends of said inclined portions, and a vertical tube having its upper end attached to the under side of said door and forming therewith a bait support and having a removable cover adapted to be attached to its lower end and disposed so as to normally force the trap door to the closed position, substantially as set forth.

In testimony whereof I have signed my name to this specification.

EDWARD G. CHERBONNIER.